United States Patent
Frijlink et al.

(10) Patent No.: US 10,920,052 B2
(45) Date of Patent: Feb. 16, 2021

(54) PROCESS FOR REDUCING FOGGING FROM HIGH MELT STRENGTH POLYPROPYLENE

(71) Applicant: NOURYON CHEMICALS INTERNATIONAL B.V., Arnhem (NL)

(72) Inventors: Wilhelm Klaas Frijlink, Zwolle (NL); Jan Martijn Van Der Schuur, Hengelo (NL); Auke Gerardus Talma, Bathmen (NL); Michel Van Den Berg, Elst (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 96 days.

(21) Appl. No.: 16/060,080

(22) PCT Filed: Dec. 5, 2016

(86) PCT No.: PCT/EP2016/079701
§ 371 (c)(1),
(2) Date: Jun. 7, 2018

(87) PCT Pub. No.: WO2017/097687
PCT Pub. Date: Jun. 15, 2017

(65) Prior Publication Data
US 2019/0263987 A1    Aug. 29, 2019

(30) Foreign Application Priority Data
Dec. 8, 2015 (EP) ..................... 15198401

(51) Int. Cl.
| C08F 110/06 | (2006.01) |
| C08K 5/092 | (2006.01) |
| C08K 5/14 | (2006.01) |
| C08K 5/1539 | (2006.01) |
| C08K 5/09 | (2006.01) |
| C08L 23/12 | (2006.01) |
| C08J 7/06 | (2006.01) |

(52) U.S. Cl.
CPC ............. C08L 23/12 (2013.01); C08F 110/06 (2013.01); C08J 7/065 (2013.01); C08K 5/09 (2013.01); C08K 5/092 (2013.01); C08K 5/14 (2013.01); C08K 5/1539 (2013.01); C08J 2323/12 (2013.01)

(58) Field of Classification Search
CPC ........ C08L 23/10; C08L 23/12; C08F 110/06; C08K 5/092; C08K 5/14; C08K 5/1539
See application file for complete search history.

(56) References Cited

U.S. PATENT DOCUMENTS

| 4,506,056 | A | * | 3/1985 | Gaylord | ................. C08F 291/00 |
| | | | | | 524/445 |
| 5,130,371 | A | * | 7/1992 | Fujita | ......................... C08F 8/00 |
| | | | | | 525/186 |
| 5,858,617 | A | * | 1/1999 | Nakayama | ............... G03F 7/029 |
| | | | | | 430/281.1 |
| 6,919,410 | B2 | | 7/2005 | Kitano et al. | |
| 8,709,561 | B2 | | 4/2014 | Bernreitner et al. | |
| 2002/0043643 | A1 | * | 4/2002 | Korehisa | .................... C08F 8/00 |
| | | | | | 252/71 |
| 2002/0161131 | A1 | * | 10/2002 | Kitano | ....................... C08F 8/00 |
| | | | | | 525/263 |
| 2003/0119996 | A1 | | 6/2003 | Kitano et al. | |
| 2004/0002569 | A1 | | 1/2004 | Kitano et al. | |
| 2012/0220730 | A1 | | 8/2012 | Li et al. | |
| 2012/0225994 | A1 | | 9/2012 | Kondo | |

FOREIGN PATENT DOCUMENTS

| CA | 1475526 A | | 2/2004 |
| CN | 1373145 A | | 10/2002 |
| CN | 1422894 A | | 6/2003 |
| CN | 102653616 A | | 9/2012 |
| CN | 106189036 A | * | 12/2016 |
| JP | 2003-171515 A | | 6/2003 |
| JP | 2004231720 A | * | 8/2004 |
| JP | 2004-339365 A | | 12/2004 |
| KR | 2002-0029765 A | | 4/2002 |
| RU | 2359978 C1 | | 6/2009 |
| RU | 2526260 C2 | | 8/2014 |
| WO | 99/27007 A1 | | 6/1999 |
| WO | 01/18074 A1 | | 3/2001 |
| WO | 2016/126429 A1 | | 8/2016 |
| WO | 2016/126430 A1 | | 8/2016 |

OTHER PUBLICATIONS

Machine translated English language equivalent of JP Application No. 2003-019915, which is the same as JP Publication 2004-231720 (2004, 7 pages).*
Machine translated English language equivalent of CN 106189036 (2016, 22 pages).*
Journal of Polymer Engineering, (2013), 33(8), 673-682.
VDA 278, "Thermal Desorption Analysis of Organic Emissions," Verband der Automobilindustrie E.V., Berlin, Oct. 2011; 47 pgs.
Tang et al.; "A New Method for Producing High Melt Strength Polypropylene With Reactive Extrusion," Polymer Engineering and Science, vol. 48, No. 7, Jul. 2008 (Jul. 2008), pp. 1339-1344, XP-002757513.
Lau et al., "Melt Strength of Polypropylene: Its Relevance to Thermoforming," Polymer Engineering and Science, vol. 38, No. 11, Nov. 1998, pp. 1915-1923, XP002757514.
European Search Report issued in the counterpart European Application No. 15198401.0 dated May 24, 2016.
Notification of Transmittal of the International Search Report and the Written Opinion of the International Searching Authority, or the Declaration from the International Bureau of WIPO for International Application No. PCT/EP2016/079701 dated Feb. 6, 2017.
TIPO, Taiwan Search Report issued in TW Application No. 105140333, dated May 22, 2020.

* cited by examiner

*Primary Examiner* — Brieann R Johnston
(74) *Attorney, Agent, or Firm* — Lorenz & Kopf, LLP

(57) ABSTRACT

Process for reducing fogging from high melt strength polypropylene (HMS-PP) obtained by heat treating polypropylene at a temperature between 150° C. and 300° C. in the presence of a dialkyl peroxydicarbonate, said process involving the introduction of an anhydride to said high melt strength polypropylene.

17 Claims, No Drawings

PROCESS FOR REDUCING FOGGING FROM HIGH MELT STRENGTH POLYPROPYLENE

This application is a national stage filing under 35 U.S.C. § 371 of PCT/EP2016/079701, filed Dec. 5, 2016, which claims priority to European Patent Application No. 15198401.0, filed Dec. 8, 2015, the contents of which are each incorporated herein by reference in their entireties.

The invention pertains to a process for reducing fogging from high melt strength polypropylene (HMS-PP).

Processes for improving the melt strength of polypropylene using a peroxide are known in the art. For instance, WO 99/027007 discloses a process which requires the use of a peroxydicarbonate. Several peroxydicarbonates are disclosed in this document, including dicetyl peroxydicarbonate, dimyristyl peroxydicarbonate, and di(4-tert-butylcyclohexyl) peroxydicarbonate.

The advantages of these particular dialkyl peroxydicarbonates are, apart from their good performance in the process, their safety aspects and ease of handling. All of them are in solid form and—in contrast to many other peroxydicarbonates—can be safely stored and handled at room temperature. In addition, they can be used in an extrusion process.

High melt strength polypropylene (HMS-PP) finds use in food packaging and automotive applications.

At higher temperatures, the decomposition product of the dialkyl peroxydicarbonate—i.e. alcohols such as cetyl alcohol, myristyl alcohol, and 4-tert-butylcyclohexanol—tend to evaporate from the HMS-PP and condense on other surfaces, thereby forming a fogged surface with reduced visual transparency. This phenomenon is called fogging.

For instance, as a result of heating an HMS-PP based food package in a microwave, the alcoholic decomposition product may evaporate and condense on the package's lid or the microwave window, thereby negatively affecting their transparency.

HMS-PP used in automotive interiors may heat up at warm weather conditions and the alcoholic decomposition product may condense on the car windows, with the evidently undesired result of reduced visibility.

It is therefore an object of the present invention to provide a process which leads to polypropylene with high melt strength and reduced fogging.

This object is achieved by the presence of an anhydride in or on said polypropylene.

The invention therefore relates to a process for reducing fogging from high melt strength polypropylene (HMS-PP) obtained by heat treating polypropylene at a temperature between 150° C. and 300° C. in the presence of a dialkyl peroxydicarbonate, said process involving the introduction of an anhydride into or onto said high melt strength polypropylene, said anhydride being selected from the group consisting of mono-anhydrides of formula (I), bisanhydrides, and oligo-anhydrides,

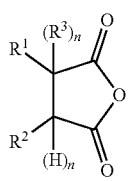
(I)

wherein $R^1$ is selected from hydrogen and saturated, unsaturated, linear, branched, and/or cyclic hydrocarbon chains with 2 to 30 carbon atoms, optionally substituted with oxygen-containing groups, $R^2$ is selected from hydrogen and saturated, unsaturated, linear, branched, and/or cyclic hydrocarbon chains with 2 to 30 carbon atoms, optionally substituted with oxygen-containing groups, $R^3$ is selected from hydrogen, hydroxyl groups, and saturated, unsaturated, linear, branched, and/or cyclic hydrocarbon chains with 2 to 30 carbon atoms, optionally substituted with oxygen-containing groups, $R^1$ and $R^2$ or $R^1$ and $R^3$ can be connected to form an aromatic ring, a saturated or unsaturated aliphatic ring, or a heterocyclic ring, n=0 if $R^1$ and $R^2$ form an aromatic ring; n=1 if $R^1$ and $R^2$ do not form an aromatic ring.

The invention also relates to a process for enhancing the melt strength of polypropylene by heat treating said polypropylene at a temperature between 150° C. and 300° C. in the presence of 0.3-3 wt %, based on the weight of the polypropylene, of a dialkyl peroxydicarbonate, wherein an anhydride as defined above is introduced into or onto said polypropylene before, during, and/or after said heat treatment, in a molar ratio anhydride functionalities/dialkyl peroxydicarbonate in the range 0.8-3.6.

The polypropylene can be a homopolymer of propylene or a random, alternating, heterophasic, or block co- or terpolymer of propylene and other olefins. Generally, a propylene copolymer or terpolymer will contain one or more other olefins, such as ethylene, butene, pentene, hexene, heptene, or octene, but it may also comprise styrene or styrene derivatives. The content of olefins other than propylene is preferably not more than 30 wt % of all monomers.

Polypropylene homopolymers and copolymers of propylene and ethylene are most preferred. It is also possible to use mixtures of polypropylene and polyethylene.

The melting point of commercially available propylene homopolymer is about 160-170° C. The melting point of propylene copolymers and terpolymers is generally lower.

The molecular weight of the polypropylene used can be selected from a wide range. Indicative of the molecular weight is the melt flow index (MFI). Use may be made of a polypropylene having a MFI from 0.1 to 1000 g/10 min (230° C., 21.6 N). Preferably, use is made of a polypropylene having a MFI from 0.5 to 250 g/10 min.

The polypropylene may be a branched polypropylene, such as described in WO 2016/126429 and WO 2016/126430.

The peroxydicarbonate has the formula R—O—C(=O)—O—O—C(=O)—O—R, wherein R is a linear, branched, or cyclic alkyl group.

More preferably, the peroxydicarbonate is solid at room temperature. The solid peroxydicarbonate can be used in various forms, such as powder or flakes.

Even more preferably, the peroxydicarbonate is selected from dicetyl peroxydicarbonate, dimyristyl peroxydicarbonate, and di(4-tert-butylcylcohexyl)peroxydicarbonate. Most preferably, the peroxydicarbonate is dicetyl peroxydicarbonate.

The anhydride is selected from the group consisting of mono-anhydrides of formula (I), bisanhydrides, and oligo-anhydrides $R^1$ in formula (I) is selected from hydrogen and saturated, unsaturated, linear, branched, and/or cyclic hydrocarbon chains with 2 to 30, preferably 3 to 24, more preferably 3 to 22, and most preferably 3 to 18 carbon atoms, optionally substituted with oxygen-containing groups. Examples of such oxygen-containing groups are hydroxyl and/or carboxylic acid groups.

$R^2$ is selected from hydrogen and saturated, unsaturated, linear, branched, and/or cyclic hydrocarbon chains with 2 to 30, preferably 3 to 24, more preferably 3 to 22, and most preferably 8 to 18 carbon atoms, optionally substituted with oxygen-containing groups. Examples of such oxygen-containing groups are hydroxyl and/or carboxylic acid groups.

$R^3$ is selected from hydrogen, hydroxyl, and saturated, unsaturated, linear, branched, and/or cyclic hydrocarbon chains with 2 to 30, preferably 3 to 24, more preferably 3 to 22, and most preferably 3 to 18 carbon atoms, optionally substituted with oxygen-containing groups.

$R^1$ and $R^2$ or $R^1$ and $R^3$ can be connected to form an aromatic ring, a saturated or unsaturated aliphatic ring, or a heterocyclic ring. It will be evident that, if $R^1$ and $R^2$ form an aromatic ring, n=0. In all other cases, n=1.

An example of a bisanhydride is pyromellitic dianhydride.

Examples of oligo-anhydrides are maleic anhydride-grafted polyolefins and styrene-maleic anhydride copolymers (SMA).

In a preferred embodiment, the anhydride has a structure according to formula (I). An example of such an anhydride is phthalic anhydride.

More preferably, $R^1$ and $R^3$ in formula (I) are hydrogen.

Even more preferably, $R^2$ in formula (I) is an unsaturated hydrocarbon chain. Most preferably, the anhydride is an alkenyl succinic anhydride (ASA).

The ASA preferably has an alkenyl chain $R^2$ with 6 to 24, more preferably 6 to 22, and most preferably 8 to 18 carbon atoms. The alkenyl chain can be based on α-olefins (n-alkenyls) or on isomerized olefins (internal- or i-alkenyls).

Examples of suitable ASA's include n-octenyl succinic anhydride (OSA; i.e. 3-[(E)-oct-1-enyl]oxolane-2,5-dione), n-dodecenyl succinic anhydride (DDSA; i.e. (2-dodecen-1-yl)succinic anhydride), tetrapropenyl succinic anhydride (TPSA; i.e. 3-[(E)-4,6,8-trimethylnon-2-en-2-yl]oxolane-2,5-dione), n-octadecenyl succinic anhydride (n-ODSA; i.e. dihydro-3-(octadecenyl)-2,5-furandione), i-octadecenyl succinic anhydride (i-ODSA; i.e. 2,5-furandione, dihydro-, mono-C18-alkenyl derivatives), i-hexa/octadecenyl succinic anhydride (i-H/ODSA; 2,5-furandione, dihydro-, mono-C16/C18-alkenyl derivatives).

The latter two products are isomer mixtures, registered as 2,5-furandione, dihydro-, mono-C15-20-alkenyl derivatives.

Also mixtures of different ASAs (e.g. with different alkenyl chain lengths) and mixtures of different isomers (i.e. differently branched isomers, optionally in combination with the linear isomer) can be used.

Alternatively, the anhydride is of formula (I) with $R^1$ and $R^2$ being linked to form a ring. Examples thereof include cyclohexene anhydride and adducts with furan or cyclopentadiene. The latter two are displayed below:

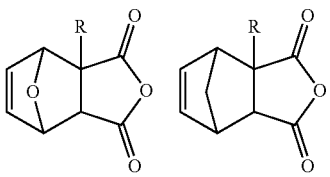

Alternatively, the anhydride is of formula (I) with $R^1$ and $R^3$ being linked to form a ring. Examples thereof are displayed below:

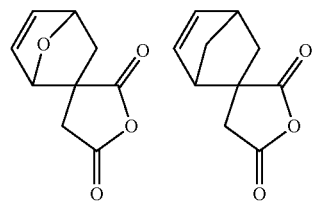

The anhydride is introduced into or onto the polypropylene before, during, and/or after the heat treatment with peroxydicarbonate. The anhydride is present in a mole ratio anhydride groups/peroxydicarbonate of more than 0.8, preferably more than 1.0, and most preferably more than 1.2. This ratio is preferably not more than 3.6, more preferably not more than 3.2, even more preferably not more than 2.8, and most preferably not more than 2.5.

The anhydride can be added as such to the polypropylene, or can be formed in-situ. In the latter case, the corresponding polycarboxylic acid can be added to the polymer, which transforms into the anhydride during the heat treatment. Alternatively, the polycarboxylic acid can be added to the high melt strength polypropylene and transformed into the anhydride during a subsequent heating step, for instance during compounding the HMS-PP with other materials.

Examples of suitable polycarboxylic acids are citric acid, phthalic acid, succinic acid, and succinic acid-modified polyolefins/oligomers.

Addition of anhydride or polycarboxylic acid prior to the heat treatment can be conducted by mixing it into the polypropylene. Addition of anhydride or polycarboxylic acid during the heat treatment can be conducted by separate dosing or side feeding to an extruder.

The heat treatment is performed at a temperature in the range of 150-300° C., more preferably 155-250° C., and most preferably 160-240° C.

It is preferred to carry out the heat treatment in an atmosphere of inert gas, such as nitrogen, carbon dioxide, or argon. Preferably, nitrogen is used.

The heat treatment can suitably be carried out in conventional melt mixing equipment. Preferably, the heat treatment is performed in an extruder. The use of an extruder allows modification of the polypropylene to be combined with pelletization. More preferably, use is made of a twin screw extruder. The residence time in an extruder is generally about 10 seconds to 5 minutes.

The screw speed of the extruder is preferably in the range 25-500 rpm. The temperature of the extruder should be above the melting temperature of the polypropylene.

The process of the present invention can be carried out as a batch process, a continuous process, or a combination thereof. A continuous process is preferred.

The dialkyl peroxydicarbonate is added to the polypropylene prior to or during the heat treatment. It may be added separately or in admixture with the anhydride or polycarboxylic acid.

In a preferred embodiment, the dialkyl peroxydicarbonate, anhydride or polycarboxylic acid, and polypropylene are added to an extruder at the same time, e.g. by using (a) feeder(s).

Alternatively, the anhydride or polycarboxylic acid may be added after the heat treatment using conventional ways of blending additives into polymers.

The dialkylperoxydicarbonates to be used in the process of the present invention are preferably solid at room temperature and may be added to the polypropylene as water-based formulation (suspension), as solution, as dispersion in an inert solvent such as isododecane, in the form of flakes, as a powder, or as a masterbatch in a polymer or on an inert solid carrier.

In one embodiment, the peroxydicarbonate and the anhydride or polycarboxylic acid are mixed prior to addition to the polypropylene. The present invention therefore also relates to a formulation comprising dialkyl peroxydicarbonate and an anhydride or polycarboxylic acid, wherein the concentration of anhydride and polycarboxylic acid is 15-65 wt %, based on the combined weight of anhydride, polycarboxylic acid, and dialkyl peroxydicarbonate. Preferably, the anhydride and polycarboxylic acid concentration is 20-60 wt %, and most preferably 25-55 wt % based on the combined weight of anhydride, polycarboxylic acid, and dialkyl peroxydicarbonate.

If desired, this formulation additionally contains a polymer (e.g. polypropylene) or inert solid carrier (e.g. silica), preferably in combination with anti-oxidants and/or acid catchers (e.g. calcium stearate). Such formulations will have the form of a powder mixture of the individual ingredients or of a masterbatch of peroxydicarbonate and polycarboxylic acid or anhydride in or on a polymeric or inert solid carrier matrix.

The quantity of dialkyl peroxydicarbonate to be used will depend on the desired degree of modification and on the type of polypropylene employed. Preferably, use is made of dialkyl peroxydicarbonate concentrations in the range of 0.3 to 3 g of peroxide per 100 g polypropylene, more preferably in the range of 0.5 to 2 g per 100 g polypropylene.

The heat treatment may be conducted in the presence of a co-agent in order to influence the melt flow index of the polypropylene and/or to enhance the degree of modification. A co-agent is generally understood to be a polyfunctional reactive additive such as a polyunsaturated compound which will react rapidly with polymer radicals, will overcome steric hindrance and minimize undesirable side reactions. The incorporation of an effective amount of one or more of these co-agents into the polypropylene, prior to or during the process of the present invention tends to influence the melt flow index and molecular weight of the resulting polypropylene.

If so desired, conventional adjuvants, in an amount known to one skilled in the art, such as antioxidants, UV-stabilizers, lubricants, antidegradants, foaming agents, nucleating agents, fillers, pigments, acid catchers (e.g. calcium stearate), and/or antistatic agents may be added to the polypropylene. These adjuvants can be added to the polypropylene before as well as during or after the heat treatment. For example, a chemical blowing agent (e.g. azodicarbonamide) can be added or a physical blowing agent (e.g. a gas like nitrogen, carbon dioxide, butane, or isobutane) can be injected into an extruder in order to produce foamed polypropylene. A chemical blowing agent is preferably added before or after the heat treatment; a physical blowing agent is preferably injected during or after the heat treatment. Preferably, a stabilizer, e.g. one or more antioxidants, is added in order to deactivate any free radicals still present in the HMS-PP as well as any radicals which may be formed later from subsequent processing under air/oxygen. In a typical experiment, from 0.01 to 1.0 parts of an antioxidant per hundred parts of polypropylene are used.

The HMS-PP may be further processed as known to one of ordinary skill in the art. It may be formed directly into a desired end product, it may be processed using an underwater pelletizer, or it may be purified, modified, moulded, or blended miscible amounts of other (polymer) materials, such as EPM, EPDM, and/or LDPE. Thus, there may be modifications using another polymer or monomer in order to enhance the end product's compatibility with other materials.

Alternatively, the HMS-PP may be degraded to increase its processability and/or applicability or may be further processed by, for example, foaming, foam moulding, injection moulding, blow moulding, extrusion coating, profile extrusion, cast film extrusion, blown film extrusion, and/or thermoforming.

EXAMPLES

Fogging Analysis

Fogging analysis (FOG) was carried out according to automotive method VDA 278 (Verband der Automobilindustrie e.V., Berlin, October 2011). This standard method involves dynamic headspace GC analysis.

In order to determine VOC, i.e. volatile organic compounds, a sample was heated to 90° C. during 30 minutes in a glass desorption tube under helium purge.

After VOC analysis, the same desorption tube was heated to 120° C. during 60 minutes under helium purge, in order to determine FOG, i.e. FOGging organic compounds. The released volatiles were accumulated on a cold trap. After desorption, the trap was rapidly heated and the components were transferred to a GC column for analysis. An FID (flame ionization) detector was used for quantification of the FOG value; an MSD (mass spectrometry) detector was used to identify the relevant eluted organic compounds (in the boiling range of n-alkanes with chain length C14 to C32).

For the FOG value, the amount of volatiles was calculated using the response factor of hexadecane. The contribution of all organic compounds in the boiling range of n-alkanes with chain length C14 to C32 were added up (the retention time range was 12.3 to 40 minutes for the Examples given in Table 2).

The relative decrease of the FOG value as a result of the presence of reactive additive is given as % FOG reduction.

Melt Flow Index

The melt flow index (MFI) was measured with a Goettfert Melt Indexer MI-3 according to ISO 1133 (230° C./2.16 kg load). The MFI is expressed in g/10 min.

Melt Strength

The melt strength (MS) was measured (in cN) with a Goettfert Rheograph 20 (capillary rheometer) in combination with a Goettfert Rheotens 71.97, according to the manufacturer's instructions using the following configuration and settings:
Rheograph:
  Temperature: 220° C.
  Melting time: 10 minutes
  Die: capillary, length 30 mm, diameter 2 mm
  Barrel chamber and piston: diameter 15 mm
  Piston speed: 0.32 mm/s, corresponding to a shear rate of 72 $s^{-1}$
  Melt strand speed (at start): 20 mm/s
Rheotens:
  Acceleration of wheels (strand): 10 mm/$s^2$
  Barrel to mid-wheel distance: 100 mm
  Strand length: 70 mm

NMR Analysis

Spectra were recorded on a Bruker Avance-III 600 NMR spectrometer with a proton resonance frequency of 600 MHz and a carbon resonance frequency of 150 MHz. The proton NMR spectra were calibrated using the TMS present in the NMR solvent at 0.0 ppm. The carbon NMR spectra were calibrated using the $CDCl_3$ solvent peak at 77.1 ppm.

TABLE 1

NMR Spectrometer and acquisition details

| Spectrometer and Acquisition details | | |
|---|---|---|
| Probe | 5 mm BBO ATM probe and z-gradient feature | |
| Tube type | 5 mm disposable NMR tube for Bruker SampleJet | |
| Operating temperature | 300 Kelvin | |
| | $^1$H-NMR | $^{13}$C-NMR |
| Operating frequency | 600 MHz | 150 MHz |
| pulse program | zg30 | zgpg30 (power gated) |
| Relaxation delay | 5 sec. | 2 sec. |
| Pulse | 30 degrees | 30 degrees |
| Time domain (TD) | 64k | 64k |
| Acquisition time | 2.66 sec. | 0.91 sec. |
| Spectrum width | 20 ppm | 240 ppm |
| Number of scans | 640 | 1024 |
| Dummy scans | 2 | 2 |
| Processing parameters | | |
| data size (SI) | 64k | 64k |
| Line broadening | 0.3 Hz | 3 Hz |
| ME_mod | no | no |
| NCOEF | 0 | 0 |

Solvent used: $CDCl_3$

Extraction Procedure

An accurate amount of 1 g of the HMS-PP granules was extracted with an accurate amount of 10 g deuterated chloroform for 72 hours at room temperature. 1 ml of this chloroform extract solution was then transferred into a 5 mm NMR tube and the $^1$H-NMR spectrum was recorded applying the conditions listed in Table 1.

The HMS-PP granules were extracted for a second time in the same way. Results for both extracts were combined.

The "digital ERETIC" method was applied to enable quantification of the samples. In brief, this method calculates a sensitivity factor from the calibration of a known molar concentration of NMR standard, and applies it to the unknown sample spectrum. This allows the molar concentration of the unknown sample to be quantified.

Extrusion 500 g of polypropylene homopolymer (PP) powder, 10 g (2 phr) dicetyl peroxydicarbonate (Perkadox® 24L), 0.5 g (0.1 phr) Irganox® 1010 antioxidant, and the respective amounts of reactive additive (see Table 2) were mixed in a bucket with a spatula, and subsequently on a bucket mixer for 10 min.

Reactive additives that were difficult to homogeneously distribute (like waxy solids) were first dissolved in 20 ml dichloromethane or acetone, and drop wise added to the 500 g PP powder (containing 0.5 g Irganox® 1010) in the bucket and mixed well with a spatula. The solvent was then allowed to evaporate in a fumehood for 4 hours.

Dicetyl peroxydicarbonate (Perkadox® 24L, ex-AkzoNobel) was then added and mixed well with a spatula, after which the complete composition was mixed with a bucket mixer for 10 min.

The compounds were extruded on a Haake PolyLab OS RheoDrive 7 system fitted with a Haake Rheomex OS PTW16 extruder (co-rotating twin-screw, L/D=40), from Thermo Scientific, using following settings:

Temperature profile settings: hopper at 30° C., zone 1 at 160° C., zones 2-4 at 190° C., zones 5-6 at 200° C., zones 7-10 at 210° C.

Screw speed: 280 rpm.

Throughput: 1.4 kg/h, dosed by a Brabender gravimetric screw feeder type DDW-MD2-DSR28-10.

Nitrogen was purged at the hopper (3.5 L/min) and the die (9 L/min).

The extruded material was led through a water bath for cooling and the cooled strands were granulated by an automatic granulator.

The extruded HMS-PP compounds ('wet' samples) were analysed for fogging reduction.

One sample was analysed for fogging after drying at 60° C. for 16 hours in a circulation oven in order to mimic drying in a silo on industrial scale.

Another sample was extruded without peroxide, but in the presence of citric acid and cetyl alcohol.

Before measuring MFI and MS, the samples were dried at 60° C. for 16 hours in a circulation oven.

The results are displayed in Table 2.

The blank PP sample in Table 2 refers to untreated polypropylene mixed with 0.1 phr Irganox® 1010 only.

That cetyl alcohol, formed upon decomposition of the peroxide, is the (major) cause of fogging is confirmed by experiment 3, which shows similar FOG reduction as the same experiment in which cetyl alcohol was replaced with dicetyl peroxydicarbonate (38% vs. 41%).

Table 2 further shows that fogging can be reduced effectively using the reactive additives—i.e. anhydrides according to the invention and acids which form such anhydrides in situ.

The presence of reactive additive did not negatively influence the performance of the peroxydicarbonate used: good melt flow indeces and melt strengths were obtained in the presence of the reactive additive.

TABLE 2

Results of HMS-PP treated with various reactive polycarboxylic acids and (polymeric) anhydrides

| Exp. | Peroxide? | Reactive additive type & amount | FOG reduction (%) | MFI (g/10 min) | MS (cN) |
|---|---|---|---|---|---|
| PP blank | — | — | — | 12.1 | 0.5 |
| 1 | yes | — | 0 | 5.3 | 9-10 |
| 2 | yes | 1.11 phr Citric acid | 41 | 5.3 | n.m. |
| 3 | no | 1.2 phr Cetyl alcohol + 1.11 phr Citric acid | 38 | 11.9 | n.m. |
| 4 | yes | 0.96 phr Phthalic acid | 51 | 5.0 | n.m. |
| 5 | yes | 0.68 phr Succinic acid | 53 | 7.3 | n.m. |
| 6 | yes | 0.86 phr Phthalic anhydride | 58 | 5.1 | 7-7.5 |
| 7 | yes | 0.88 phr 4-Cyclohexene-1,2-dicarboxylic anhydride | 40 | 4.0 | n.m. |
| 8 | yes | 1.54 phr ASA Eka SA220* | 63 | 5.3 | 9.5-10 |
| 9 | yes | 1.54 phr ASA Eka SA220* (1) | 74 | n.m. | n.m. |
| 10 | yes | 15 phr Kayabrid 006PP* | 53 | 8.6 | n.m. |

TABLE 2-continued

Results of HMS-PP treated with various reactive polycarboxylic acids and (polymeric) anhydrides

| Exp. | Peroxide ? | Reactive additive type & amount | FOG reduction (%) | MFI (g/10 min) | MS (cN) |
|---|---|---|---|---|---|
| 11 | yes | 1.21 phr ASA C8 linear* | 88 | 5.3 | 8.5-9.5 |
| 12 | yes | 1.54 phr ASA C12 linear* | 90 | 5.6 | 8.5-9 |
| 13 | yes | 1.54 phr ASA C12 branched* | 67 | 5.9 | 8-9 | n.m. = not measured
*ASA C8 linear: n-octenyl succinic anhydride (OSA), from Milliken
ASA C12 linear: n-dodecenyl succinic anhydride (DDSA), from Aldrich
ASA C12 branched: tetrapropenyl succinic anhydride (TPSA), from Milliken
ASA Eka SA220: C16/C18 alkenyl succinic anhydride, from Eka Nobel
Kayabrid ® 006PP: maleic anhydride grafted polypropylene, from AkzoNobel
(1) dried sample analyzed for FOG reduction The samples of Experiments 1, 6, 11, and 12 were subjected to the above-described extraction procedure. The results are displayed in Table 3.

The extractable amounts of cetyl alcohol (C16-OH) and monoester(s)—formed by reaction between cetyl alcohol and anhydride—confirm that the anhydrides did not graft on PP.

These experiments also confirm the formation of monoester(s) of cetyl alcohol and anhydride.

TABLE 3

NMR results of (deuterated) chloroform extractable monoesters, cetyl alcohol, and anhydride (in wt %)

| Reactive additive | Monoester(s) | C16—OH | anhydride |
|---|---|---|---|
| 1.21 phr ASA C8 linear* | 2.5 | 0.2 | <0.1 |
| 1.54 phr ASA C12 linear* | 2.8 | 0.1 | <0.1 |
| 0.86 phr Phthalic anhydride | 1.7 | 0.4 | <0.1 |
| none | none | 1.3 | none |

We claim:

1. A process for reducing fogging from high melt strength polypropylene (HMS-PP), the process comprising a step of heat treating polypropylene at a temperature between 150° C. and 300° C. in the presence of a dialkyl peroxydicarbonate to obtain a high melt strength polypropylene, introducing an anhydride into the high melt strength polypropylene, and carrying out a fogging analysis on the high melt strength polypropylene after introduction of the anhydride into the high melt strength polypropylene, wherein the anhydride is selected from the group consisting of bisanhydrides, oligo-anhydrides, and mono-anhydrides of formula (I),

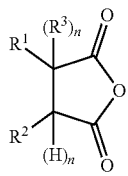

(I)

wherein $R^1$ is selected from hydrogen and saturated, unsaturated, linear, branched, or cyclic hydrocarbon chains with 2 to 30 carbon atoms, optionally substituted with oxygen-containing groups, $R^2$ is selected from hydrogen and saturated, unsaturated, linear, branched, or cyclic hydrocarbon chains with 2 to 30 carbon atoms, optionally substituted with oxygen-containing groups, $R^3$ is selected from hydrogen, hydroxyl groups, and saturated, linear, branched, and/or cyclic hydrocarbon chains with 2 to 30 carbon atoms, optionally substituted with oxygen-containing groups, $R^1$ and $R^2$ or $R^1$ and $R^3$ can be connected to form a saturated aliphatic ring or a saturated heterocyclic ring; and n=1.

2. A process for enhancing the melt strength of polypropylene, comprising heat treating the polypropylene at a temperature between 150° C. and 300° C. in the presence of 0.3-3 wt %, based on the weight of the polypropylene, of a dialkyl peroxydicarbonate, and introducing an anhydride into the polypropylene before or during said heat treatment, in a molar ratio anhydride functionalities/dialkyl peroxydicarbonate in the range 0.8-3.6, said anhydride being selected from the group consisting of mono-anhydrides of formula (I), bisanhydrides, and oligo-anhydrides,

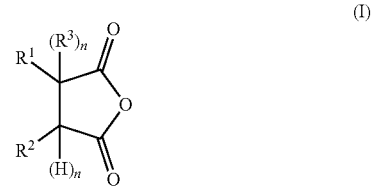

(I)

wherein $R^1$ is selected from hydrogen and saturated, linear, branched, or cyclic hydrocarbon chains with 2 to 30 carbon atoms, optionally substituted with oxygen-containing groups, $R^2$ is selected from hydrogen and saturated, unsaturated, linear, branched, or cyclic hydrocarbon chains with 2 to 30 carbon atoms, optionally substituted with oxygen-containing groups, $R^3$ is selected from hydrogen, hydroxyl groups, and saturated linear, branched, and/or cyclic hydrocarbon chains with 2 to 30 carbon atoms, optionally substituted with oxygen-containing groups, $R^1$ and $R^2$ or $R^1$ and $R^3$ can be connected to form a saturated aliphatic ring or a saturated heterocyclic ring; and n=1,
wherein the anhydride is formed in-situ from a corresponding polycarboxylic acid, said process requiring the addition of the polycarboxylic acid to the polypropylene before or during said heat treating, and
wherein the polycarboxylic acid is selected from the group consisting of citric acid;
phthalic acid; succinic acid; and succinic acid-modified polyolefins/oligomers.

3. The process according to claim 1 wherein $R^1$ and $R^3$ are hydrogen.

4. The process according to claim 3 wherein $R^2$ is an unsaturated hydrocarbon chain and the anhydride does not graft into the polypropylene.

5. The process according to claim 4 wherein the anhydride is an alkenyl succinic anhydride (ASA).

6. The process according to claim 5 wherein the ASA has an alkenyl chain with 6 to 24 carbon atoms.

7. The process according to claim 6 wherein the alkenyl chain has 8 to 18 carbon atoms.

8. The process according to claim 1 wherein the anhydride is formed in-situ from the corresponding polycarboxylic acid, said process requiring the addition of said polycarboxylic acid to the high melt strength polypropylene, which is then subjected to a further heat treatment.

9. The process according to claim 2 wherein a molar ratio anhydride functionalities/dialkyl peroxydicarbonate is in the range 1.2-2.5.

10. The process according to claim 1 wherein the dialkyl peroxydicarbonate is dicetyl peroxydicarbonate, dimyristyl peroxydicarbonate, or di(4-tert-butylcyclohexyl) peroxydicarbonate.

11. The process according to claim 1 wherein the anhydride is selected from the group consisting of n-octenyl succinic anhydride; n-dodecenyl succinic anhydride; tetrapropenyl succinic anhydride; n-octadecenyl succinic anhydride; i-octadecenyl succinic; i-hexadecenyl succinic anhydride; octadecenyl succinic anhydride and any mixtures thereof.

12. The process according to claim 1 wherein the step of heat treating is performed at a temperature between 160° C. and 240° C.

13. The process according to claim 2 wherein the step of heat treating is performed at a temperature between 160° C. and 240° C.

14. The process according to claim 8 wherein the polycarboxylic acid is selected from the group consisting of citric acid; phthalic acid; succinic acid; and succinic acid-modified polyolefins/oligomers.

15. The process according to claim 2 wherein the dialkyl peroxydicarbonate is dicetyl peroxydicarbonate, dimyristyl peroxydicarbonate, or di(4-tert-butylcyclohexyl) peroxydicarbonate.

16. A high melt strength polypropylene formed from the process of claim 1.

17. A polypropylene formed from the process of claim 2.

* * * * *